(12) United States Patent
Liu et al.

(10) Patent No.: US 11,216,284 B2
(45) Date of Patent: Jan. 4, 2022

(54) MULTI-DIE AND MULTI-CORE COMPUTING PLATFORM AND BOOTING METHOD THEREFOR

(71) Applicant: Shanghai Zhaoxin Semiconductor Co., Ltd., Shanghai (CN)

(72) Inventors: Jinglong Liu, Beijing (CN); Qunchao Feng, Beijing (CN); Yankui Niu, Beijing (CN); Yongfeng Song, Beijing (CN); Jintao Wang, Beijing (CN); Jiangbo Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/035,945

(22) Filed: Sep. 29, 2020

(65) Prior Publication Data

US 2021/0109766 A1   Apr. 15, 2021

(30) Foreign Application Priority Data

Oct. 15, 2019   (CN) .......................... 201910976748.8

(51) Int. Cl.
*G06F 9/445* (2018.01)
*G06F 9/4401* (2018.01)
*G06F 13/42* (2006.01)

(52) U.S. Cl.
CPC ........ *G06F 9/44505* (2013.01); *G06F 9/4405* (2013.01); *G06F 9/4406* (2013.01); *G06F 13/4282* (2013.01); *G06F 2213/0002* (2013.01)

(58) Field of Classification Search
CPC .. G06F 9/4405; G06F 9/44505; G06F 9/4406; G06F 13/4282; G06F 2213/0002
See application file for complete search history.

(56) References Cited

U.S. PATENT DOCUMENTS

| | | | |
|---|---|---|---|
| 2013/0151829 A1* | 6/2013 | Amann | G06F 9/4401 713/2 |
| 2015/0046680 A1* | 2/2015 | Henry | G06F 9/30076 712/34 |
| 2019/0108347 A1* | 4/2019 | Ghetie | G06F 9/22 |
| 2021/0109762 A1* | 4/2021 | Feng | G06F 13/362 |

* cited by examiner

*Primary Examiner* — Glenn A. Auve
(74) *Attorney, Agent, or Firm* — McClure, Qualey & Rodack, LLP (57) ABSTRACT

A multi-die and multi-core computing platform in which multiple dies share the same storage device for firmware code storage is shown. After a slave die loads #1 firmware code from the storage device through a bus, the right to use the bus is released by the slave die and the slave die outputs a #0 enable signal to a master die. According to the #0 enable signal, the master die gains the right to use the bus. Through the bus, the master die loads #0 firmware code from the storage device. The slave die executes the #1 firmware code and the master die executes the #0 firmware code to initialize a link between the master and slave dies.

20 Claims, 8 Drawing Sheets

MULTI-DIE AND MULTI-CORE COMPUTING PLATFORM AND BOOTING METHOD THEREFOR

CROSS REFERENCE TO RELATED APPLICATIONS

This application also claims priority of China Patent Application No. 201910976748.8, filed on Oct. 15, 2019, the entirety of which is incorporated by reference herein.

BACKGROUND OF THE INVENTION

Field of the Invention

The present invention is related to multi-die and multi-core computing platforms.

Description of the Related Art

A computing platform may include a plurality of dies. Each die may be used to build one or more cores. The links between the different dies must be initialized for the master die to boot up the whole multi-die and multi-core computing platform. How to efficiently establish the links between the dies is an important subject in the technical field.

BRIEF SUMMARY OF THE INVENTION

An exemplary embodiment of the present invention stores firmware codes of multiple dies in one storage device. The different dies share the same storage device to store firmware code. Conventionally, several storage devices are required for the different dies to separately store firmware codes. By using the same storage device to store the firmware codes of the different dies, the cost of firmware code storage and the wiring complexity are considerably reduced. The dies read the same storage device in turn to get and execute the corresponding firmware code. Earlier than the master die, the slave dies download and execute the corresponding firmware code to get ready for the initialization of the links between the dies. Finally, the master die gains the right to access the storage device and loads the corresponding firmware code. The master die and the slave dies individually execute the firmware codes to initialize the links between the dies. The master die further executes its firmware code to boot up the whole multi-die and multi-core computing platform and load an operating system to the multi-die and multi-core computing platform. It is not necessary for a slave die to complete firmware code execution before notifying the next die to load firmware code from the storage device. Thus the booting time is cut down to optimize the booting procedure.

A multi-die and multi-core computing platform in accordance with an exemplary embodiment of the present invention includes a first storage device, a master die and a first slave die. The first storage device stores number 0 firmware code and number 1 firmware code. The master die is coupled to the first storage device through a first bus. The first slave die is coupled to the first storage device through the first bus, and coupled to the master die by a link. After loading the number 1 firmware code from the first storage device through the first bus, the first slave die releases the right to use the first bus, and outputs a number 0 enable signal to the master die to transfer the right to use the first bus to the master die. Through the first bus, the master die loads the number 0 firmware code from the first storage device. The first slave die executes the number 1 firmware code and the master die executes the number 0 firmware code to initialize the link.

In an exemplary embodiment, the master die comprises a number 0 processing unit and a number 0 chipset, and the first slave die comprises a number 1 processing unit and a number 1 chipset. The number 0 processing unit is a boot strap processor. The number 1 processing unit is an application processor. The number 1 chipset and the number 0 chipset gain the right to use the first bus in turn to load the number 1 firmware code and the number 0 firmware code from the first storage device through the first bus, respectively. The number 1 firmware code is executed by the number 1 processing unit. The number 0 firmware code is executed by the number 0 processing unit. The number 1 processing unit executes the number 1 firmware code no matter whether the right to use the first bus is owned by the number 1 chipset or not.

In an exemplary embodiment, the first slave die comprises a number 1 bus controller. The number 1 bus controller releases the right to use the first bus by setting the pin that couples the first slave die to the first bus to a high impedance state.

In an exemplary embodiment, the first slave die comprises a cache memory. The first slave die caches the number 1 firmware code in the cache memory so that the first slave die may execute the number 1 firmware code no matter whether the right to use the first bus is owned by the first slave die or not.

In an exemplary embodiment, the number 0 chipset is activated according to the number 0 enable signal. Because the number 0 chipset is not activated until the number 1 chipset releases the right to use the first bus, the load of the number 1 firmware code is not disturbed.

In another exemplary embodiment, the master die comprises a number 0 chipset, and the number 0 chipset comprises a number 0 bus controller and a number 0 register. The number 0 bus controller that has been activated gains the right to use the first bus according to the number 0 register. The number 0 register is set by the number 0 enable signal.

In an exemplary embodiment, the first storage device corresponds to a first socket board and there is a second storage device corresponding to a second socket board. There are multiple dies bounded on the second socket board. The two socket boards first boot up separately. Then, the master die on the first socket board checks the link between the two socket boards, executes the rest of the booting procedure, and loads an operating system.

In another exemplary embodiment, a method for booting a multi-die and multi-core computing platform is shown. The multi-die and multi-core computing platform includes a master die and a slave die which are coupled to each other by a link. The booting method includes the following steps: driving the slave die to load number 1 firmware code from a storage device through a bus; and after the number 1 firmware code is loaded to the slave die, driving the slave die to release a right to use the bus and output a number 0 enable signal to the master die to transfer the right to use the bus to the master die. The master die loads number 0 firmware code from the storage device through the bus. The slave die executes the number 1 firmware code and the master die executes the number 0 firmware code to initialize the link.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
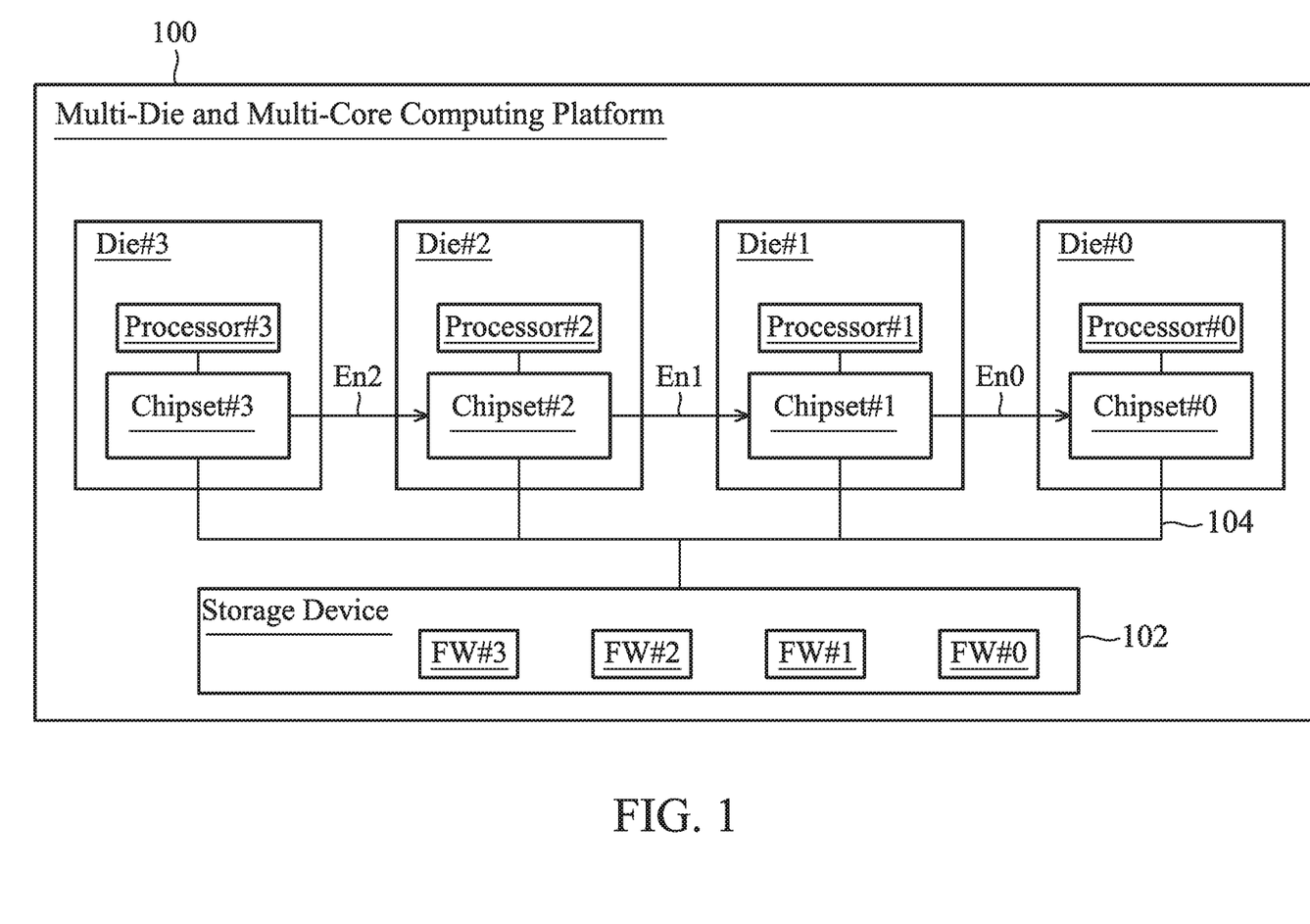
FIG. 1 illustrates a multi-die and multi-core computing platform 100 in accordance with an exemplary embodiment of the present invention.

FIG. 1 illustrates a multi-die and multi-core computing platform 100 in accordance with an exemplary embodiment of the present invention, which includes four dies Die #3, Die #2, Die #1 and Die #0. Each die provides at least one core. For example: Die #3 provides a processing unit Processor #3 and a chipset Chipset #3; Die #2 provides a processing unit Processor #2 and a chipset Chipset #2; Die #1 provides a processing unit Processor #1 and a chipset Chipset #1; and Die #0 provides a processing unit Processor #0 and a chipset Chipset #0. The dies Die #3~Die #0 correspond to the firmware codes FW #3~FW #0, respectively. The firmware codes FW #3~FW #0 are stored in the same storage device 102. Compared with using multiple storage devices to separate the firmware codes of the different dies, using the same storage device to store firmware codes of the several dies greatly reduces the storage cost of firmware code and reduces the complexity of the layout of PCB.

As shown, a bus 104 for accessing the storage device 102 is coupled to all of the dies Die #3~Die #0. The dies Die #3~Die #0 access the storage device 102 through the bus 104 in turn to get the firmware codes FW #3~FW #0, respectively. After loading the firmware code FW #3 from the storage device 102 through the bus 104, the chipset Chipset #3 releases the right to use the bus 104 and outputs an enable signal En2 to the next die Die #2 to transfer the right to use the bus 104 to the chipset Chipset #2. After loading the firmware code FW #2 from the storage device 102 through the bus 104, the chipset Chipset #2 releases the right to use the bus 104 and outputs an enable signal En1 to the next die Die #1 to transfer the right to use the bus 104 to the chipset Chipset #1. After loading the firmware code FW #1 from the storage device 102 through the bus 104, the chipset Chipset #1 releases the right to use the bus 104 and outputs an enable signal En0 to the next die Die #0 to transfer the right to use the bus 104 to the chipset Chipset #0. Through the bus 104, the chipset Chipset #0 loads the firmware code FW #0 from the storage device 102, and the processing unit Processor #0 executes the firmware code FW #0. Specifically, in a slave die Die #3/Die #2/Die #1, the processing unit Processor #3/Processor #2/Processor #1 executes the firmware code FW #3/FW #2/FW #1 no matter whether the chipset Chipset #3/Chipset #2/Chipset #1 owns the right to use the bus 104 or not. Therefore, the dies Die #3~Die #0 can be booted in parallel.

Because of the parallel execution of the firmware codes FW #3~FW #0, the links between the dies Die #3~Die #0 are established quickly. After the link establishment, the chipset Chipset #0 continues to load the rest of the firmware code FW #0 from the storage device 102. The processing unit Processor #0 executing the firmware code FW #0 dominates the remaining booting procedure of the multi-die and multi-core computing platform 100, and so that an operating system (OS) is loaded to the multi-die and multi-core computing platform 100. The multi-die and multi-core computing platform 100 operates.

It should be noted that each die of the multi-die and multi-core computing platform 100 of the present invention does not necessarily include a chipset, and the total number of slave dies is not limited to any number. FIG. 1 using three slave dies Die #3~Die #1 is merely an example, and the present invention is not limited thereto. The multi-die and multi-core computing platform 100 includes a storage device 102 storing firmware codes FW #3~FW #0 of the dies Die #3~Die #1. The master die Die #0 and the slave dies Die #3~Die #1 are coupled to the storage device 102 through the bus 104. The slave dies Die #3~Die #1 should be linked to the master die Die #0. After loading the firmware code FW #1 from the storage device 102 through the bus 104, the slave die Die #1 releases the right to use the bus 104 and outputs an enable signal En0 to the master die Die #0. According to the enable signal En0, the master die Die #0 gains the right to use the bus 104. There is no need for the master die Die #0 to release the right to use the bus 104 after gaining it from the slave dies Die #3~Die #1. At this time, the storage device 102 exclusively supplies the firmware code FW #0 to the master die Die #0. When the slave dies Die #3~Die #1 execute their respective firmware codes FW #3~FW #1, and the master die Die #0 executes the firmware code FW #0 to initialize the links between the slave dies Die #3~Die #1 and the master die Die #0.

In an exemplary embodiment, the storage device 102 is a serial peripheral interface read-only memory (SPI ROM). The bus 104 is an SPI bus.

In an exemplary embodiment, the dies Die #3, Die #2, Die #1, and Die #0 are arranged on a single socket board. In an exemplary embodiment, the dies Die #3, Die #2, Die #1, and Die #0 are fabricated as one single chip.

Figure 2:
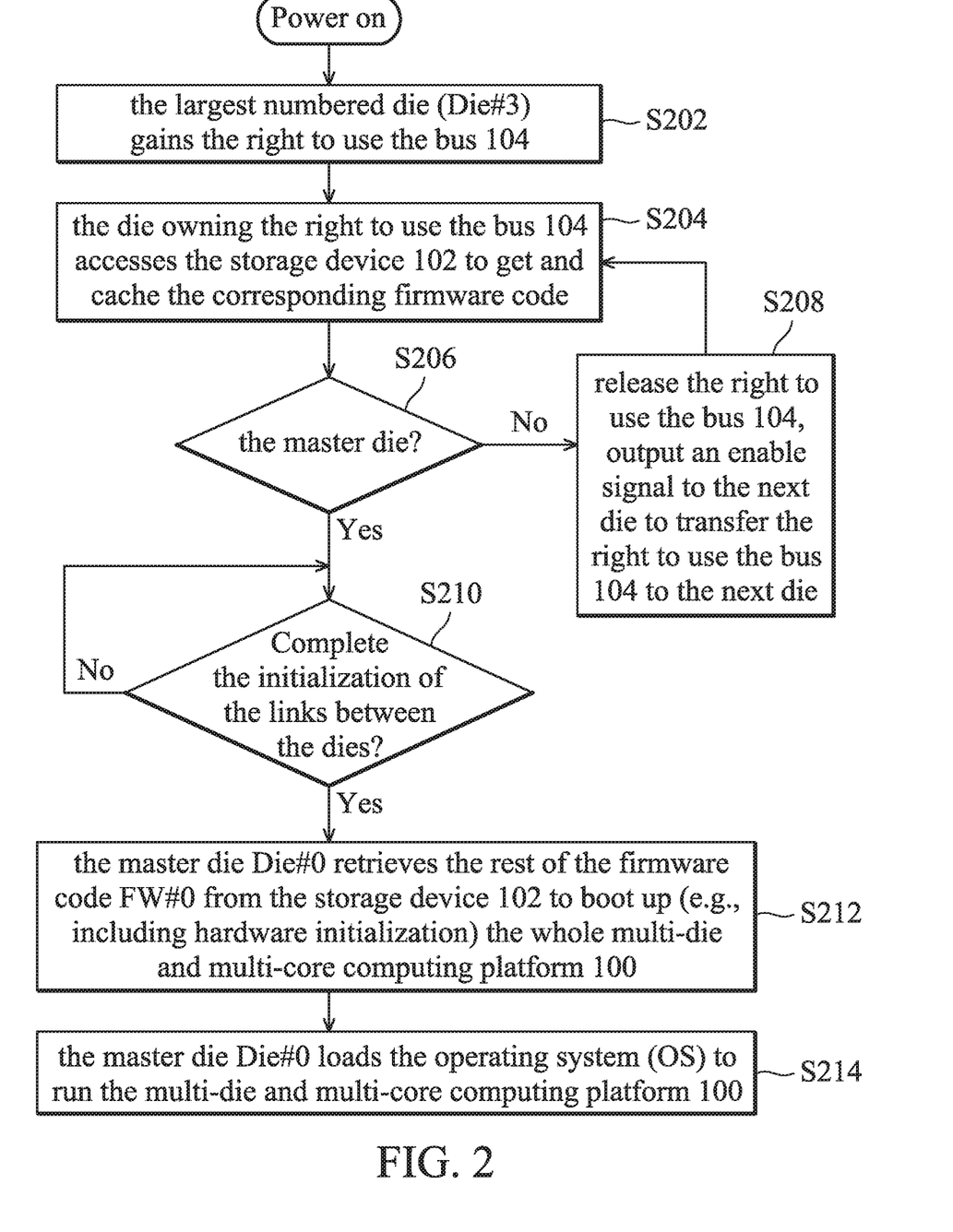
FIG. 2 is a flowchart illustrating the operational concept of FIG. 1.

FIG. 2 is a flowchart illustrating the operational concept of FIG. 1.

When the multi-die and multi-core computing platform 100 is powered on, the largest numbered die Die #3 gains the right to use the bus 104 (step S202). In step S204, the die Die

3 owning the right to use the bus 104 loads the storage device 102 to get the firmware code FW #3. Since the die Die #3 is not the master die (judged by step S206), the flow proceeds to step S208. In step S208, the die Die #3 releases the right to use the bus 104, and outputs an enable signal En2 to the die Die #2 to transfer the right to use the bus 104 to the die Die #2. Step S204 is repeated. The die Die #2 owning the right to use the bus 104 loads the storage device 102 to get the firmware code FW #2. Steps S208 and S204 are repeatedly executed until the master die Die #0 gains the right to use the bus 104 to get the corresponding firmware code. The firmware codes FW #3 . . . FW #0 are executed in parallel in an optimized manner. Step S210 checks the initialization of the links between the dies Die #3 . . . Die #0, wherein the link initialization is based on the execution of the firmware codes FW #3 . . . FW #0. After the link initialization, step S212 is performed. In step S212, the master die Die #0 retrieves the rest of the firmware code FW #0 from the storage device 102 to boot up (e.g., including hardware initialization) the whole multi-die and multi-core computing platform 100. In step S214, the master die Die #0 loads the operating system (OS) to the multi-die and multi-core computing platform 100 and the multi-die and multi-core computing platform 100 runs. In this exemplary embodiment, only the firmware code FW #0 of the master die Die #0 includes the complete booting system (e.g., a BIOS code or UEFI code) to boot up all dies. The processing unit Processor #0 may be a boot strap processor (BSP). The firmware codes FW #3~FW #1 of the slave dies Die #3~Die #1 are responsible for the link initialization. The processing units Processor #3~Processor #1 may be application processors (APs), which are initialized and managed by the master die Die #0 executing the firmware code FW #0. This architecture also works in a shutdown procedure.

What is important in the invention is that before the master die Die #0 execute the firmware code FW #0 to boot the multi-die and multi-core computing platform 100, the dies Die #3~Die #0 use the bus 104 in turn to load the same storage device 102 and retrieve the firmware codes FW #3~FW #0 from the same storage device 102. According to the retrieved firmware codes FW #3~FW #0, links between the dies Die #3~Die #0 are initialized for the die Die #0 executing the firmware code FW #0 to boot the multi-die and multi-core computing platform 100.

Figure 3:
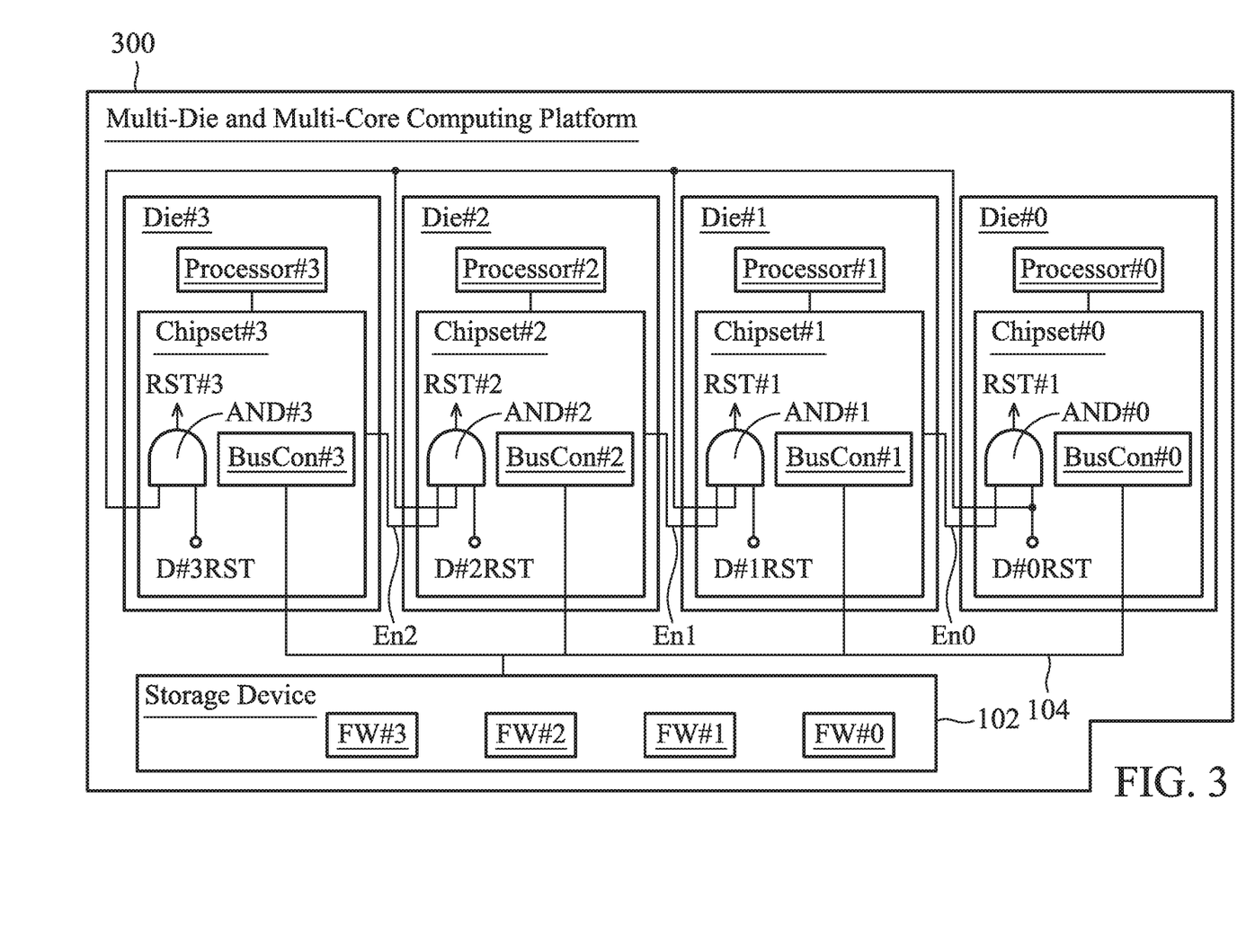
FIG. 3 illustrates a multi-die and multi-core computer platform 300 in accordance with an exemplary embodiment of the present invention.

FIG. 3 illustrates a multi-die and multi-core computer platform 300 in accordance with an exemplary embodiment of the present invention. The chipsets Chipset #3~Chipset #0 are reset (i.e., activated) in a staggered way to let the dies Die #3 to Die #0 to gain the right to use the bus 104 in turn.

The chipsets Chipset #3 . . . Chipset #0 include logic AND gates AND #3 . . . AND #0, respectively, and include bus controllers BusCon #3 . . . BusCon #0, respectively. The original reset signals D #3RST . . . D #0RST of the dies Die #3 . . . Die #0 are processed by the logic AND gates AND #3~AND #0, respectively, so that the chipsets Chipset #3 . . . Chipset #0 may be reset by reset signals RST #3 . . . RST #0 (chipset reset signals) rather than by the original reset signals D #3RST . . . D #0RST of the dies Die #3 . . . Die #0.

In an exemplary embodiment, the reset signals D #3RST . . . D #0RST are asserted by the power button of the multi-die and multi-core computing platform 300 (e.g., pressing the power button for power-up, or having a long press for reset). The reset signal D #0RST of the master die Die #0 may be further asserted by a reset of the operating system (OS) of the multi-die and multi-core computing platform 300. In FIG. 3, the reset signal D #0RST of the master die Die #0 is coupled to the slave dies Die #3 . . . Die #1, so that the booting procedure as presented can be started by the power button or by resetting the operating system (OS).

The chipset Chipset #3 of the die Die #3 is the first chipset to be reset. According to the reset signal D #3RST of the die Die #3 and the reset signal D #0RST of the master die Die #0, the logic AND gate AND #3 outputs the reset signal RST #3 to activate the chipset Chipset #3. The north bridge (not shown) in the chipset Chipset #3 is activated and outputs a read request (for example, ROMSIP) to the bus controller BusCon #3. In response to the read request, the bus controller BusCon #3 loads the firmware code FW #3 from the storage device 102 through the bus 104. After the firmware code FW #3 is indeed cached (e.g., using the L2 cache of the processing unit Processor #3 to cache the firmware code FW #3), the bus controller BusCon #3 releases the right to use the bus 104. For example, the pin of the die Die #3 that couples the die Die #3 to the bus 104 is set to a high-impedance state. The chipset Chipset #3 outputs the enable signal En2 to the die Die #2 and, accordingly, the right to use the bus 104 is transferred to the die Die #2.

As for the die Die #2, the logic AND gate AND #2 receives the reset signal D #2RST of the die Die #2, the reset signal D #0RST of the die Die #0 and the enable signal En2, and outputs the reset signal RST #2 for the chipset Chipset #2. The chipset Chipset #2 is activated. The north bridge (not shown) in the chipset Chipset #2 is activated and outputs a read request (for example, ROMSIP) to the bus controller BusCon #2. In response to the read request, the bus controller BusCon #2 loads the firmware code FW #2 from the storage device 102 through the bus 104. After the firmware code FW #2 is indeed cached (e.g., cached in the L2 cache of the processing unit Procesor #2), the bus controller BusCon #2 releases the right to use the bus 104. The chipset Chipset #2 outputs the enable signal En1 to the die Die #1 and, accordingly, the right to use the bus 104 is transferred to the die Die #1.

As for the die Die #1, the logic AND gate AND #1 receives the reset signal D #1RST of the die Die #1, the reset signal D #0RST of the die Die #0 and the enable signal En1, and outputs the reset signal RST #1 for the chipset Chipset #1. The chipset Chipset #1 is activated. The north bridge (not shown) in the chipset Chipset #1 is activated and outputs a read request (for example, ROMSIP) to the bus controller BusCon #1. In response to the read request, the bus controller BusCon #1 loads the firmware code FW #1 from the storage device 102 through the bus 104. After the firmware code FW #1 is indeed cached (e.g., using the L2 cache of the processing unit Procesor #1 to cache the firmware code FW #1), the bus controller BusCon #1 releases the right to use the bus 104. The chipset Chipset #1 outputs the enable signal En0 and, accordingly, the right to use the bus 104 is transferred to the die Die #0.

As for the master die Die #0, the logic AND gate AND #0 receives the reset signal D #0RST of the master die Die #0 and the enable signal En0, and outputs the reset signal RST #0 for the chipset Chipset #0. The chipset Chipset #0 is activated. The north bridge (not shown) in the chipset Chipset #0 is activated and outputs a read request (for example, ROMSIP) to the bus controller BusCon #0. In response to the read request, the bus controller BusCon #0 loads the firmware code FW #0 from the storage device 102 through the bus 104. The slave dies Die #3~Die #1 execute the firmware code FW #3~FW #1, respectively, and the master die Die #0 executes the firmware code FW #0 to initialize the links between the dies. The master die Die #0 further controls the booting procedure of the multi-die and multi-core computing platform 300 and loads the operating system (OS) to the multi-die and multi-core computing platform 300 to run the multi-granular multi-core computing platform 300.

The bus controllers BusCon #3~BusCon #0 may control the impedance of the pins coupling the dies Die #3~Die #0 to the bus 104, to determine which of the dies Die #3~Die #0 gains the right to use the bus 104. For example, high pin impedance really isolates a die from the bus 104.

The dies Die #3~Die #0 may execute their own firmware codes FW #3~FW #0 almost in parallel.

Figure 4:
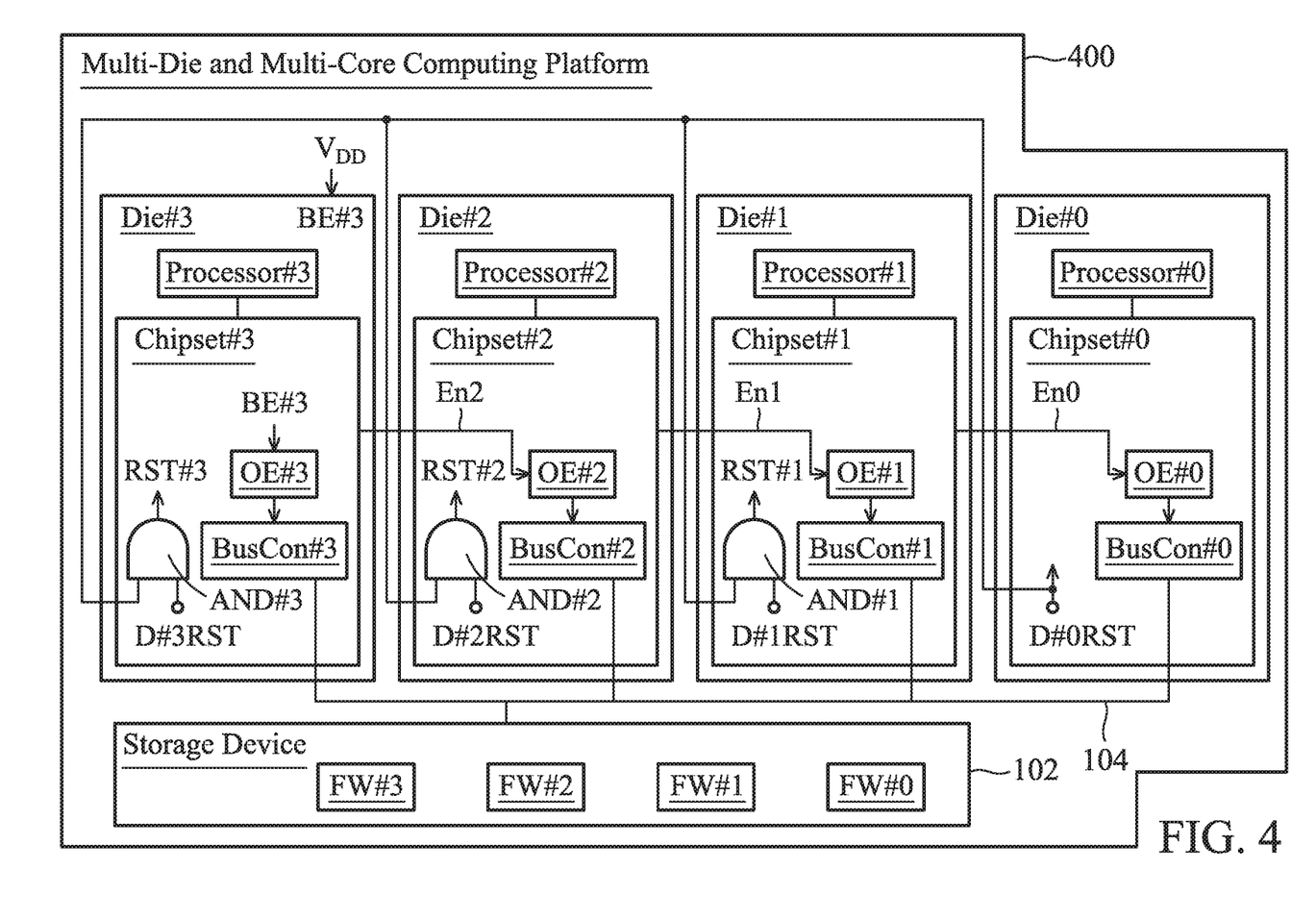
FIG. 4 illustrates a multi-die and multi-core computing platform 400 in accordance with another embodiment of the present invention.

FIG. 4 illustrates a multi-die and multi-core computing platform 400 in accordance with another embodiment of the present invention. Rather than being reset in a staggered way (referring to the dies Die #3~Die #0 of the multi-die and multi-core computing platform 300), the dies Die #3~Die #0 of the multi-die and multi-core computing platform 400 are reset together. The bus controllers BusCon #3~BusCon #0 which have been reset (activated) are permitted to gain the right to use the bus 104 in a staggered way.

The chipsets Chipset #3~Chipset #1 of the slave dies Die #3~Die #1 have logic AND gates AND #3~AND #1, respectively. The reset signals D #3RST . . . D #1RST of the dies Die #3 . . . Die #1 are sent to the logic AND gates AND #3~AND #1, respectively, to be "AND" with the reset signal D #0RST of the master die Die #0. Chipset reset signals RST #3 . . . RST #1 are generated by the logic AND gates AND #3~AND #1, respectively. The booting procedure of the multi-die and multi-core computing platform 400, therefore, can be started by the power button or the reset of the operating system (OS). In this exemplary embodiment, the chipsets Chipset #3~Chipset #1 of the dies Die #3~Die #1 may be regarded as being directly reset by the reset signal D #0RST of the master die Die #0. Typically, all of the reset signals D #3RST . . . D #0RST may be asserted by pressing the power button of the multi-die and multi-core computing platform 400 and thereby the chipsets Chipset #3~Chipset #0 of the dies Die #3~Die #0 may be reset at the same time and all of the bus controllers BusCon #3~BusCon #0 of the chipsets Chipset #3~Chipset #0 are activated together. How to schedule the bus controllers BusCon #3~BusCon #0 to load the storage device 102 in turn is described in the following paragraphs.

The chipsets Chipset #3~Chipset #0 have registers OE #3~OE #0, respectively, to determine whether to block the bus controllers BusCon #3~BusCon #0 from using the bus 104.

The die Die #3 is coupled to the power supply VDD by a pin BE #3. The register OE #3 is set according to the pin BE #3. According to the register OE #3, the bus controller BusCon #3 is the first bus controller permitted to gain the right to use the bus 104. Through the bus 104, the bus controller BusCon #3 loads the firmware code FW #3 from the storage device 102 and loads the firmware code FW #3 to the L2 cache of the processing unit Processor #3. After the firmware code FW #3 is cached in the L2 cache, the chipset Chipset #3 cleans the register OE #3 and thereby the bus controller BusCon #3 releases the right to use the bus 104. The chipset Chipset #3 outputs (via a pin BD #3 of the die Die #3, not shown) an enable signal En2 to the next die Die #2 (received by a pin BE #2 of the die Die #2, not shown) to fill the register OE #2 and, accordingly, the right to use the bus 104 is transferred to the die Die #2.

According to the enable signal En2, the chipset Chipset #2 sets the register OE #2 to permit the bus controller BusCon #2 to gain the right to use the bus 104. Through the bus 104, the bus controller BusCon #2 loads the firmware code FW #2 from the storage device 102 and loads the firmware code FW #2 to the L2 cache of the processing unit Processor #2. After the firmware code FW #2 is cached in the L2 cache, the chipset Chipset #2 cleans the register OE #2 and thereby the bus controller BusCon #2 releases the right to use the bus 104. The chipset Chipset #2 outputs (via a pin BD #2 of the die Die #2, not shown) an enable signal En1 to the next die Die #1 (received by a pin BE #1 of the die Die #1, not shown) to fill in the register OE #1 and, accordingly, the right to use the bus 104 is transferred to the die Die #1.

According to the enable signal En1, the chipset Chipset #1 sets the register OE #1 to permit the bus controller BusCon #1 to gain the right to use the bus 104. Through the bus 104, the bus controller BusCon #1 loads the firmware code FW #1 from the storage device 102 and loads the firmware code FW #1 to the L2 cache of the processing unit Processor #1. After the firmware code FW #1 is cached in the L2 cache, the chipset Chipset #1 cleans the register OE #1 and thereby the bus controller BusCon #1 releases the right to use the bus 104. The chipset Chipset #1 outputs (via a pin BD #1 of the die Die #1, not shown) an enable signal En0 to the next die Die #0 (received by a pin BE #0 of the die Die #0, not shown) to fill in the register OE #0 and, accordingly, the right to use the bus 104 is transferred to the die Die #0.

According to the enable signal En0, the chipset Chipset #0 sets the register OE #0 to permit the bus controller BusCon #0 to gain the right to use the bus 104. Through the bus 104, the bus controller BusCon #0 loads the firmware code FW #0 from the storage device 102 and loads the firmware code FW #0 to the L2 cache of the processing unit Processor #0. When the master die Die #0 executes the firmware code FW #0 and the slave dies Die #3~Die #1 execute the firmware codes FW #3~FW #1, the links between every two dies are initialized and, and then the multi-die and multi-core computing platform 400 is booted up. It should be noted that one difference between the embodiments of FIG. 3 and FIG. 4 is the activation timing of the bus controllers BusCon #3~BusCon #0. In FIG. 3, the bus controllers BusCon #3~BusCon #0 are activated in a staggered way. In FIG. 4, the bus controllers BusCon #3~BusCon #0 are simultaneously activated, and the right to load the storage device 102 through the bus 104 is assigned to the bus controllers BusCon #3~BusCon #0 in turn. Because the bus controllers BusCon #3~BusCon #0 may be blocked from the bus 104 by controlling the registers OE #3~OE #0, read requests to the storage device 102 can be responded later. Firmware code of each die can be read from the storage device 102 in the proper timing.

Figure 5:
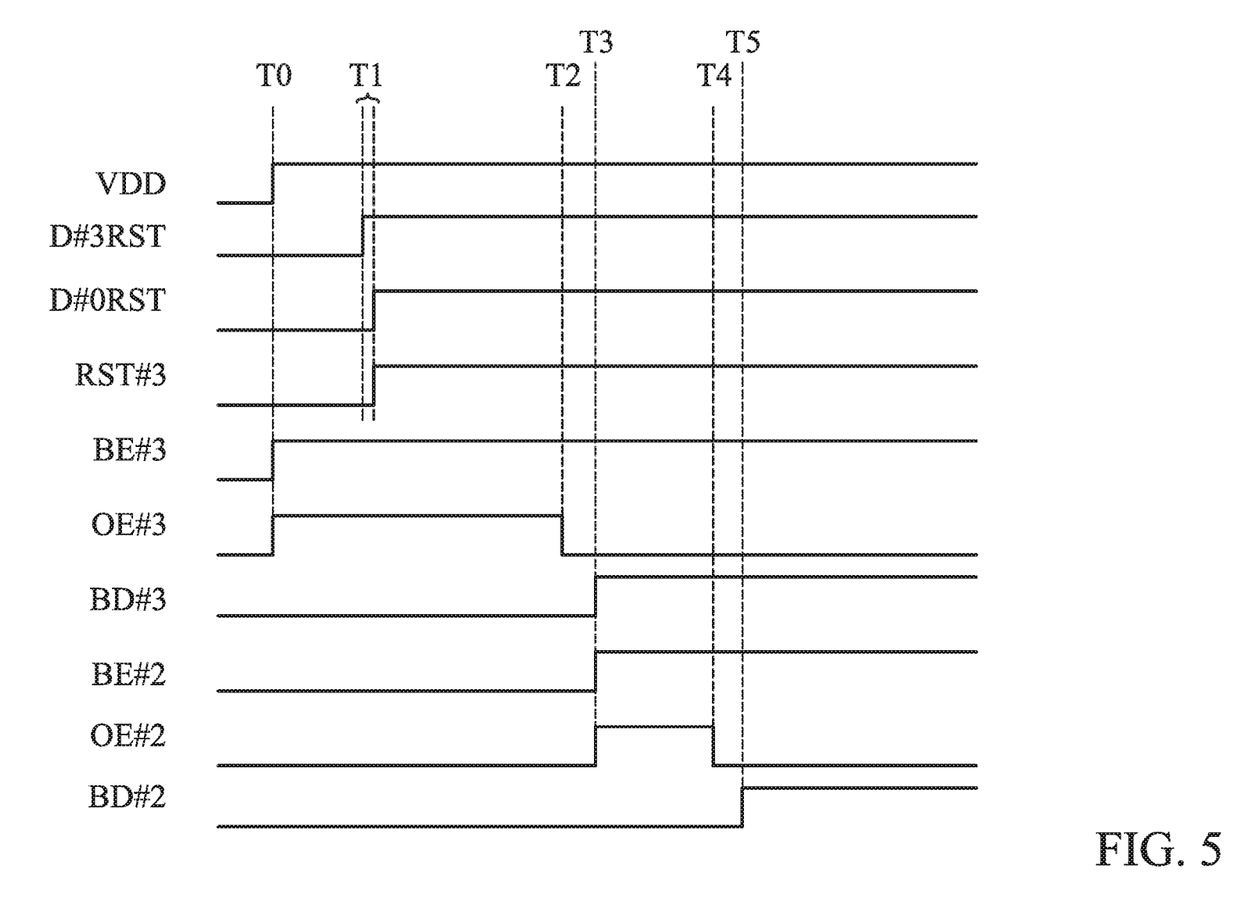
FIG. 5 is a timing diagram illustrating the booting procedure of the multi-die and multi-core computing platform 400.

FIG. 5 is a timing diagram illustrating the booting procedure of the multi-die and multi-core computing platform 400.

At time T0, the power supply VDD is turned on. The signal at the pin BE #3 of the die Die #3 is pulled up. The register OE #3 is set to 1.

In the time interval T1, the reset signals D #3RST~D #0RST of the dies Die #3~Die #0 are pulled up one by one. The logic AND gate AND #3 pulls up the reset signal RST #3 of the chipset Chipset #3. The chipset Chipset #3 is reset and, accordingly, the bus controller BusCon #3 within the chipset Chipset #3 is reset. Due to the high value registered in the register OE #3, the bus controller BusCon #3 gains the right to use the bus 104. In response to the read request (e.g., ROMSIP) from the north bridge of the chipset Chipset #3, the bus controller BusCon #3 loads the firmware code FW #3 from the storage device 102 through the bus 104.

At time T2, the chipset Chipset #3 determines that the firmware code FW #3 is completely cached, and cleans the register OE #3 to zero. The bus controller BusCon #3 releases the right to use the bus 104.

At time T3, the signal at the pin BD #3 of die Die #3 is pulled up. The asserted enable signal En2 is transferred to the die Die #2 and received by the pin BE #2. Accordingly, the register OE #2 is set to 1 and the bus controller BusCon #2, which has already been activated in the time interval T1, gains the right to use the bus 104. In response to the read request (e.g., ROMSIP) from the north bridge of the chipset Chipset #2, the bus controller BusCon #2 loads the firmware code FW #2 from the storage device 102 through the bus 104.

At time T4, the chipset Chipset #2 determines that the firmware code FW #2 is completely cached and sets the register OE #2 to zero. The bus controller BusCon #2 releases the right to use the bus 104.

At time T5, the signal at the pin BD #2 of die Die #2 is pulled up. The asserted enable signal En1 is transferred to the next die Die #1.

FIG. 5 illustrates the timing sequence of the successive actions of the different dies. In the computing platform 400, all chipsets Chipset #3~Chipset #0 and their bus controllers BusCon #3~BusCon #0 are activated at an earlier time (in comparison with the platform 300). Read requests (e.g., ROMSIP) are ready in advanced. When a die receives an enable signal, no additional time is required to wait for a read request (e.g., ROMSIP). Operational efficiency is improved. Specifically, only one bus controller of the bus controllers BusCon #3~BusCon #0 coupled to the bus 104 is really connected to the bus 104. Signal interference is avoided.

Figure 6:
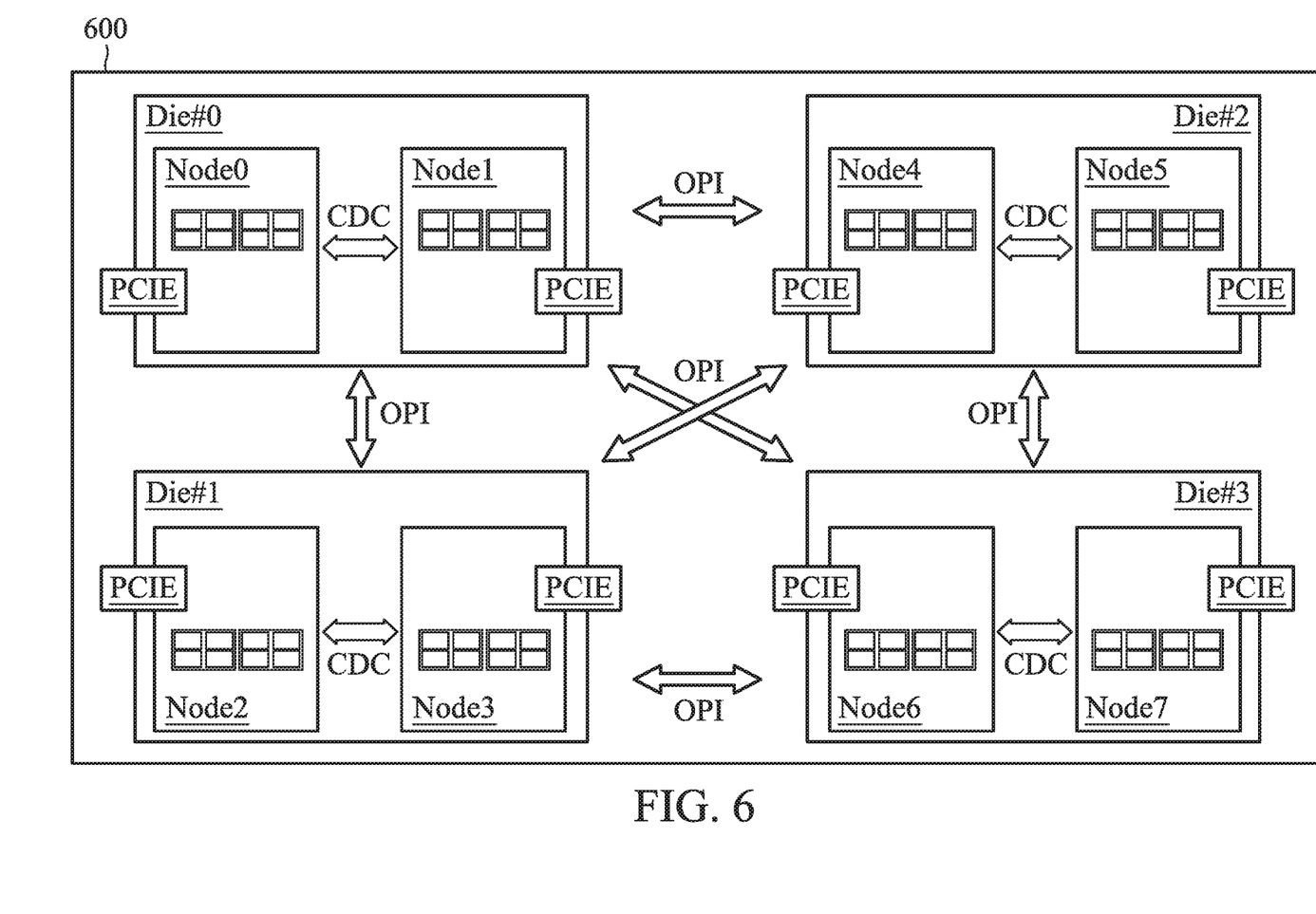
FIG. 6 illustrates a socket board 600. Each die may provide multiple computing cores.

FIG. 6 illustrates a socket board 600. Each die may provide multiple computing cores. Each computing core is labeled with a node number Node # and has a high-speed serial computer expansion bus PCIE. With the techniques disclosed in the foregoing embodiments, each die with loaded firmware code initializes the links (e.g., OPI) to other dies and initializes the links (e.g., CDC) between all computing cores on the same die. Benefiting from the booting design of the present invention, the initialization of the CDC links is also fast and simple.

Figure 7:
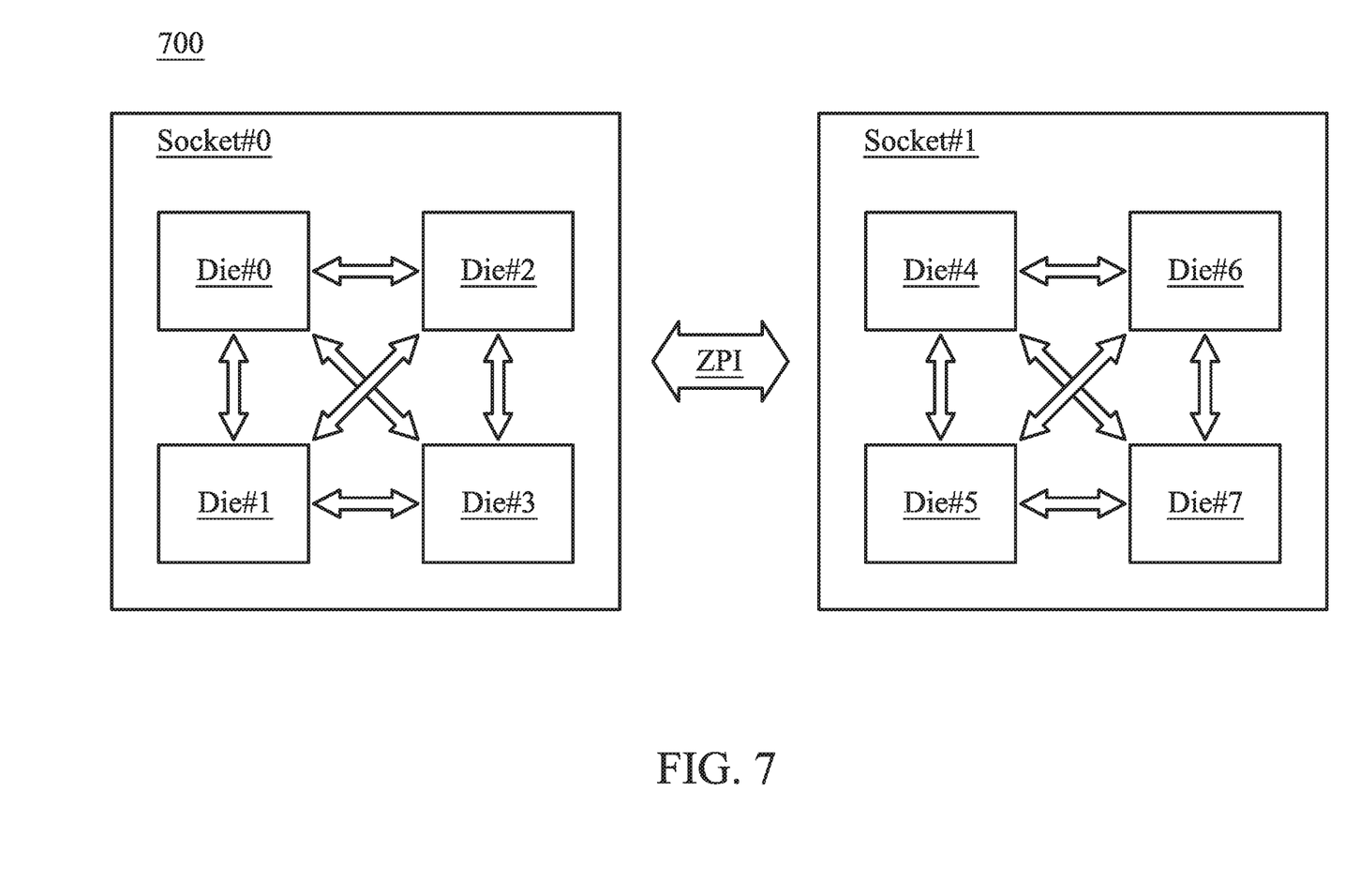
FIG. 7 illustrates a multi-die and multi-core computing platform 700 that is formed by two socket boards Socket #0 and Socket #1.

FIG. 7 illustrates a multi-die and multi-core computing platform 700 that is formed by two socket boards Socket #0 and Socket #1.

The two socket boards Socket #0 and Socket #1 may share one storage device to store the firmware codes. As show, there are slave dies Die #7~Die #1 and one master die Die #0. Based on the techniques of the foregoing embodiments, the order that the dies load their firmware codes from the same storage device is: Die #7, Die #6, Die #5, Die #4, Die #3, Die #2, Die #1, and finally Die #0.

The two socket boards Socket #0 and Socket #1 may each correspond to one storage device for firmware code storage. The socket board Socket #0 is the master socket board and the socket board Socket #1 is the slave socket board.

On the slave socket board Socket #1, the order that the dies load their firmware codes from the same storage device is: Die #7, Die #6, Die #5 and finally Die #4. After completing the initialization of the links between all dies on the socket board Socket #1, the die Die #4 initializes the socket board Socket #1, e.g., initializing the socket board communication interface (for example, ZPI). After the ZPI initialization, the slave socket board Socket #1 waits for a communication request from the master socket board Socket #0.

The booting procedure of the master socket board Socket #0 may be performed in parallel with the booting procedure of the slave socket board Socket #1.

On the master socket board Socket #0, the order that the dies load their firmware codes from the same storage device is: Die #3, Die #2, Die #1 and finally Die #0. After completing the initialization of the links between all dies on the socket board Socket #0, the die Die #0 initializes the socket board Socket #0, e.g., initializing the socket board communication interface (for example, ZPI), to communicate with the slave socket board Socket #1.

After the link initialization between the two socket boards Socket #0 and Socket #1 is completed, the master die Die #0 of the master socket board Socket #0 executes the subsequent booting procedure and loads the operating system (OS).

Figure 8A:
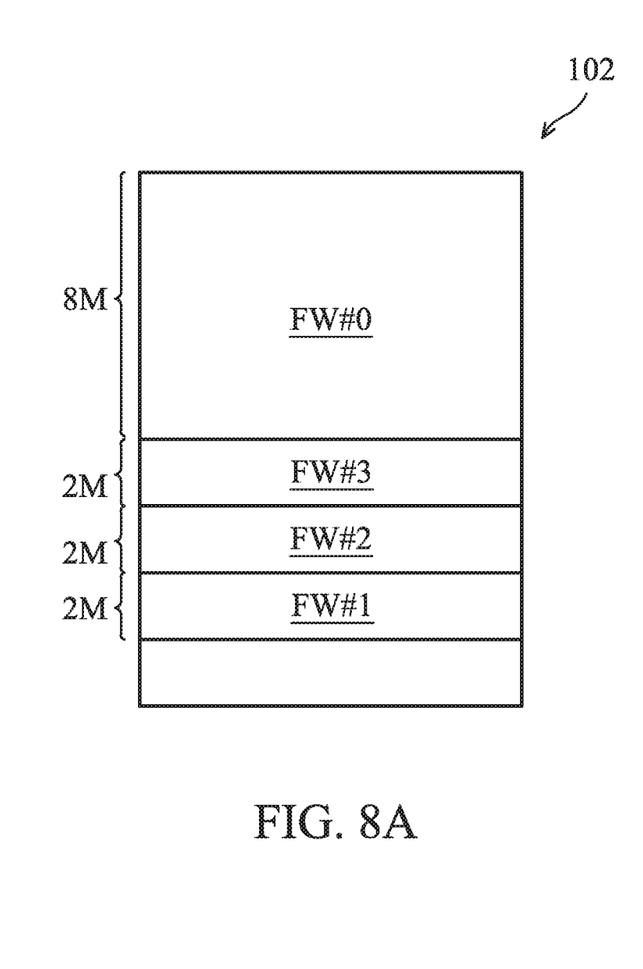
FIG. 8A illustrates the allocation (in a fixed manner) of the storage device 102 in accordance with an exemplary embodiment of the present invention.

FIG. 8A illustrates the allocation (in a fixed manner) of the storage device 102 in accordance with an exemplary embodiment of the present invention. The storage space of the storage device 102 is 16M in total. The first 8M stores the firmware code FW #0 of the master die Die #0. The following 6M is divided into three segments (2M each), fixed for the firmware codes FW #3~FW #1.

Figure 8B:
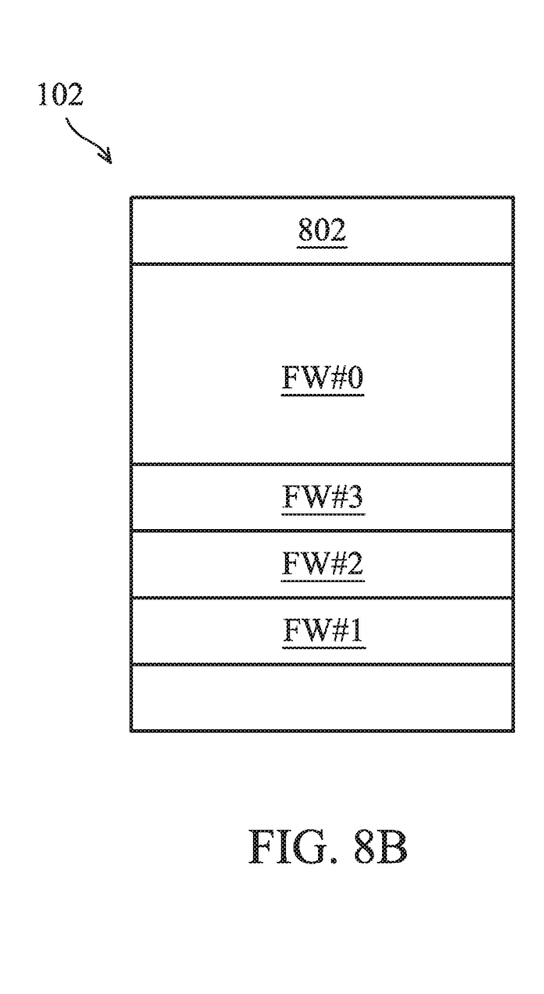
FIG. 8B illustrates the allocation of the storage device 102 in accordance with another exemplary embodiment of the present invention.

FIG. 8B illustrates the allocation of the storage device 102 in accordance with another exemplary embodiment of the present invention. The addresses of the firmware codes FW #3~FW #0 are recorded in the field 802. A more flexible allocation is shown.

Specifically, the forgoing link initialization is due to the need for link training, which is required to determine the data rate and the bandwidth prior to establishing the links (e.g., OPI or ZPI) between the dies. By the execution of firmware codes, physical hardware is set and triggered to perform the link training. The hardware writes the training result to the registers for the further execution of the firmware codes. In the slave dies, the firmware codes are executed for the link initialization. In the master die, the firmware code is not only executed for the link initialization. The firmware code of the master die is also responsible for the system booting of the entire platform. The firmware code of the master die also loads the operating system to the master die.

Without using an arbitration circuit, a storage device of firmware code is shared by multiple dies.

The enabling signals may be transferred between the dies through general input and output pins (GPIO).

A die may cache the firmware code by another kind of storage device rather than a cache memory of a processing unit. In other exemplary embodiments, a RAM space may be allocated to cache firmware code.

A long firmware code may be cached and executed in sections. The right to use the bus is released until the last section of firmware code is loaded and cached.

A method for booting a multi-die and multi-core computing platform in accordance with an exemplary embodiment of the present invention is shown. There is a master die and at least one slave die on the multi-die and multi-core computing platform. There is at least one link between the master die and the slave die. The booting method includes the following steps: driving the slave die to load a number 1 firmware code from a storage device through a bus; and after the slave die loads the number 1 firmware code, driving the slave die to release a right to use the bus and output a number 0 enable signal to the master die to transfer the right to use the bus to the master die. Through the bus, the master die loads a number 0 firmware code from the storage device. The slave die executes the number 1 firmware code and the master die executes the number 0 firmware code to initialize the link between the slave die and the master die. Specifically, the slave die executes the number 1 firmware code no matter whether the slave die owns the right to use the bus or not. This booting method can be modified to create variants.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-die and multi-core computing platform, comprising:
    a first storage device, storing a number 0 firmware code and a number 1 firmware code;
    a master die, coupled to the first storage device through a first bus; and
    a first slave die, coupled to the first storage device through the first bus, and coupled to the master die by a link, wherein:
    after loading the number 1 firmware code from the first storage device through the first bus, the first slave die releases a right to use the first bus, and outputs a number 0 enable signal to the master die to transfer the right to use the first bus to the master die;
    through the first bus, the master die loads the number 0 firmware code from the first storage device; and
    the first slave die executes the number 1 firmware code and the master die executes the number 0 firmware code to initialize the link.

2. The multi-die and multi-core computing platform as claimed in claim 1, wherein:
    the master die comprises a number 0 processing unit and a number 0 chipset;
    the first slave die comprises a number 1 processing unit and a number 1 chipset;
    the number 0 processing unit is a boot strap processor; and
    the number 1 processing unit is an application processor.

3. The multi-die and multi-core computing platform as claimed in claim 2, wherein:
    the number 1 chipset and the number 0 chipset gain the right to use the first bus in turn to load the number 1 firmware code and the number 0 firmware code from the first storage device through the first bus, respectively;
    the number 1 firmware code is executed by the number 1 processing unit;
    the number 0 firmware code is executed by the number 0 processing unit; and
    the number 1 processing unit executes the number 1 firmware code no matter whether the right to use the first bus is owned by the number 1 chipset or not.

4. The multi-die and multi-core computing platform as claimed in claim 1, wherein:
    the first slave die comprises a number 1 bus controller; and
    the number 1 bus controller releases the right to use the first bus by setting a pin that couples the first slave die to the first bus to a high impedance state.

5. The multi-die and multi-core computing platform as claimed in claim 1, wherein:
    the first slave die comprises a cache memory; and
    the first slave die caches the number 1 firmware code in the cache memory so that the first slave die executes the number 1 firmware code no matter whether the right to use the first bus is owned by the first slave die or not.

6. The multi-die and multi-core computing platform as claimed in claim 1, wherein:
    the master die comprises a number 0 chipset that is activated according to the number 0 enable signal.

7. The multi-die and multi-core computing platform as claimed in claim 1, wherein:
    the master die comprises a number 0 chipset, and the number 0 chipset comprises a number 0 bus controller and a number 0 register;
    in response to activation, the number 0 bus controller gains the right to use the first bus according to the number 0 register; and
    the number 0 register is set by the number 0 enable signal.

8. The multi-die and multi-core computing platform as claimed in claim 1, further comprising:
    a second slave die, coupled to the first storage device through the first bus; and
    a third slave die, coupled to the first storage device through the first bus,
    wherein:
    the first storage device further stores a number 2 firmware code and a number 3 firmware code;
    after loading the number 3 firmware code from the first storage device through the first bus, the third slave die releases the right to use the first bus and outputs a number 2 enable signal to the second slave die to transfer the right to use the first bus to the second slave die; and
    after loading the number 2 firmware code from the first storage device through the first bus, the second slave die releases the right to use the first bus, and outputs a number 1 enable signal to the first slave die to transfer the right to use the first bus to the first slave die.

9. The multi-die and multi-core computing platform as claimed in claim 8, wherein:
    the third slave die executes the number 3 firmware code, the second slave die executes the number 2 firmware code, the first slave die executes the number 1 firmware code, and the master die executes the number 0 firmware code to initialize links between every two of the third slave die, the second slave die, the first slave die and the master die; and
    after link initialization, the master die further executes the number 0 firmware code to initialize the multi-die and multi-core computing platform and load an operating system to the multi-die and multi-core computing platform.

10. The multi-die and multi-core computing platform as claimed in claim 8, wherein:
    the third slave die comprises a number 3 chipset;
    the second slave die comprises a number 2 chipset that is activated by the number 2 enable signal;
    the first slave die comprises a number 1 chipset that is activated by the number 1 enable signal; and
    the master die comprises a number 0 chipset that is activated by the number 0 enable signal.

11. The multi-die and multi-core computing platform as claimed in claim 10, wherein:
    the number 0 chipset comprises a number 0 AND gate and a number 0 bus controller;

the number 1 chipset comprises a number 1 AND gate and a number 1 bus controller;

the number 2 chipset comprises a number 2 AND gate and a number 2 bus controller;

the number 3 chipset comprises a number 3 AND gate and a number 3 bus controller;

the number 3 AND gate receives a master reset signal from the master die and a third original reset signal of the third slave die, and outputs a number 3 reset signal for the number 3 chipset to activate the number 3 bus controller to load the number 3 firmware code from the first storage device through the first bus;

the number 2 AND gate receives the master reset signal from the master die, a second original reset signal of the second slave die, and the number 2 enable signal, and outputs a number 2 reset signal for the number 2 chipset to activate the number 2 bus controller to load the number 2 firmware code from the first storage device through the first bus;

the number 1 AND gate receives the master reset signal from the master die, a first original reset signal of the first slave die, and the number 1 enable signal, and outputs a number 1 reset signal for the number 1 chipset to activate the number 1 bus controller to load the number 1 firmware code from the first storage device through the first bus; and the number 0 AND gate receives the master reset signal of the master die and the number 0 enable signal, and outputs a number 0 reset signal for the number 0 chipset to activate the number 0 bus controller to load the number 0 firmware code from the first storage device through the first bus.

12. The multi-die and multi-core computing platform as claimed in claim 8, wherein:

the master die comprises a number 0 chipset, and the number 0 chipset comprises a number 0 bus controller and a number 0 register;

the first slave die comprises a number 1 chipset, and the number 1 chipset comprises a number 1 bus controller and a number 1 register;

the second slave die comprises a number 2 chipset, and the number 2 chipset comprises a number 2 bus controller and a number 2 register;

the third slave die comprises a number 3 chipset, and the number 3 chipset comprises a number 3 bus controller and a number 3 register;

in response to activation, the number 3 bus controller gains the right to use the first bus according to the number 3 register;

the number 3 register is set according to a power signal of the third slave die;

in response to activation, the number 2 bus controller gains the right to use the first bus according to the number 2 register;

the number 2 register is set according to the number 2 enable signal;

in response to activation, the number 1 bus controller gains the right to use the first bus according to the number 1 register;

the number 1 register is set according to the number 1 enable signal;

in response to activation, the number 0 bus controller gains the right to use the first bus according to the number 0 register; and the number 0 register is set according to the number 0 enable signal.

13. The multi-die and multi-core computing platform as claimed in claim 12, wherein:

the number 1 chipset has a number 1 AND gate;

the number 2 chipset has a number 2 AND gate;

the number 3 chipset has a number 3 AND gate;

the number 3 AND gate receives a master reset signal of the master die and a third original reset signal of the third slave die, and outputs a number 3 reset signal for the number 3 chipset to activate the number 3 bus controller;

the number 2 AND gate receives the master reset signal of the master die and a second original reset signal of the second slave die, and outputs a number 2 reset signal for the number 2 chipset to activate the number 2 bus controller;

the number 1 AND gate receives the master reset signal of the master die and a first original reset signal of the first slave die, and outputs a number 1 reset signal for the number 1 chipset to activate the number 1 bus controller;

the number 0 chipset is reset by the master reset signal of the master die to activate the number 0 bus controller;

the master reset signal of the master die, the first original reset signal of the first slave die, the second original reset signal of the second slave die, and the third original reset signal of the third slave die are asserted by a power button of the multi-die and multi-core computing platform; and the master reset signal of the master die is also asserted by a reset of an operating system of the multi-die and multi-core computing platform.

14. The multi-die and multi-core computing platform as claimed in claim 8, further comprising:

a first socket board with the master die, the first slave die, the second slave die, and the third slave die; and a second socket board with a fourth slave die, a fifth slave die, a sixth slave die and a seventh slave die, which are coupled to the first storage device through the first bus, wherein:

the first storage device further stores a number 4 firmware code, a number 5 firmware code, a number 6 firmware code, and a number 7 firmware code;

after loading the number 7 firmware code from the first storage device through the first bus, the seventh slave die releases the right to use the first bus, and outputs a number 6 enable signal to the sixth slave die to transfer the right to use the first bus to the sixth slave die;

after loading the number 6 firmware code from the first storage device through the first bus, the sixth slave die releases the right to use the first bus, and outputs a number 5 enable signal to the fifth slave die to transfer the right to use the first bus to the fifth slave die;

after loading the number 5 firmware code from the first storage device through the first bus, the fifth slave die releases the right to use the first bus, and outputs a number 4 enable signal to the fourth slave die to transfer the right to use the first bus to the fourth slave die; and after loading the number 4 firmware code from the first storage device through the first bus, the fourth slave die releases the right to use the first bus, and outputs a number 3 enable signal to the third slave die to transfer the right to use the first bus to the third slave die.

15. The multi-die and multi-core computing platform as claimed in claim 8, further comprising:
- a second storage device, storing number 4 firmware code, number 5 firmware code, number 6 firmware code, and number 7 firmware code;
- a first socket board with the master die, the first slave die, the second slave die, and the third slave die; and
- a second socket board with a fourth slave die, a fifth slave die, a sixth slave die and a seventh slave die, which are coupled to the second storage device through a second bus, wherein:
- the seventh slave die, the sixth slave die, the fifth slave die, and the fourth slave die access the second storage device through the second bus in turn to load the number 7 firmware code, the number 6 firmware code, the number 5 firmware code and the number 4 firmware code, respectively;
- the seventh slave die executes the number 7 firmware code, the sixth slave die executes the number 6 firmware code, the fifth slave die executes the number 5 firmware code, and the fourth slave die executes the number 4 firmware code to initialize links between every two of the seventh slave die, the sixth slave die, the fifth slave die, and the fourth slave die;
- the fourth slave die further executes the number 4 firmware code to initialize the second socket board to await a communication request from the master die executing the number 0 firmware code; and
- according to the communication request, the fourth slave die executes the number 4 firmware code to initialize a link between the first socket board and the second socket board.

16. A method for booting a multi-die and multi-core computing platform that includes a master die and a slave die coupled to each other by a link, comprising:
- driving the slave die to load number 1 firmware code from a storage device through a bus; and
- after the number 1 firmware code is loaded to the slave die, driving the slave die to release a right to use the bus and output a number 0 enable signal to the master die to transfer the right to use the bus to the master die, wherein:
- the master die loads number 0 firmware code from the storage device through the bus; and
- the slave die executes the number 1 firmware code and the master die executes the number 0 firmware code to initialize the link.

17. The method as claimed in claim 16, wherein:
- the master die comprises a number 0 processing unit and a number 0 chipset;
- the slave die comprises a number 1 processing unit and a number 1 chipset;
- the number 1 chipset and the number 0 chipset gain the right to use the bus in turn to load the number 1 firmware code and the number 0 firmware code from the storage device, respectively;
- the number 1 firmware code is executed by the number 1 processing unit, and the number 0 firmware code is executed by the number 0 processing unit; and
- the number 1 processing unit executes the number 1 firmware code no matter whether the number 1 chipset owns the right to use the bus or not.

18. The method as claimed in claim 16, further comprising:
- releasing the right to use the bus from the slave die by setting a pin of the slave die that couples the slave die to the bus to a high impedance state.

19. The method as claimed in claim 16, wherein:
- the master die comprises a number 0 chipset and the number 0 chipset is activated by the number 0 enable signal.

20. The method as claimed in claim 16, wherein:
- the master die comprises a number 0 chipset and the number 0 chipset comprises a number 0 bus controller and a number 0 register;
- in response to activation, the number 0 bus controller gains the right to use the bus according to the number 0 register; and
- the number 0 register is set by the number 0 enable signal.

* * * * *